April 28, 1964
L. PÉRAS
3,130,992
BALL-AND-SOCKET JOINTS
Filed Nov. 14, 1960
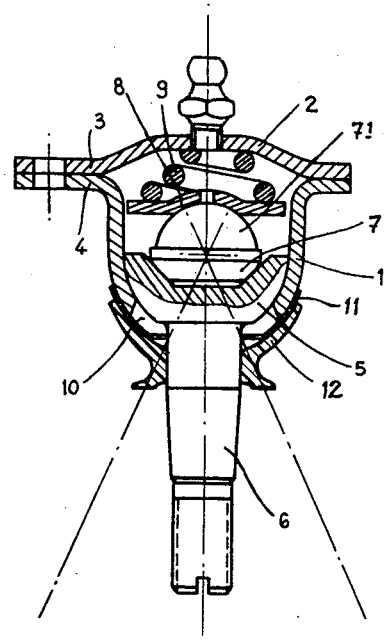
Fig _ 1
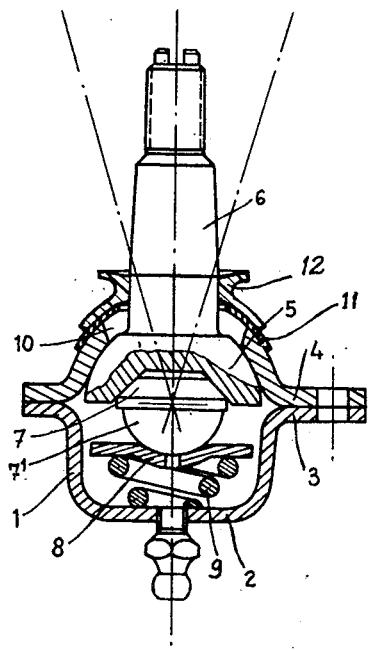
Fig _ 2
INVENTOR
LUCIEN PÉRAS 3,130,992
BALL-AND-SOCKET JOINTS
Lucien Péras, Billancourt, France, assignor to Regie
Nationale des Usines Renault, Billancourt, France
Filed Nov. 14, 1960, Ser. No. 68,780
Claims priority, application France Nov. 20, 1959
1 Claim. (Cl. 287—87)

This invention relates to ball-and-socket and knuckle joints notably for automobile vehicles and has specific reference to improvements in their manufacture with a view to facilitate their production by cold stamping.

The improvements constituting the subject-matter of this invention are characterized by the provision of a socket member consisting of two pressed parts secured to a suitable part of the vehicle, one of these parts, namely the female member, being formed with an inner spherical or part-spherical cavity and adapted to receive the male member of the joint which is caused resiliently to bear against said female member by a compression spring placed in the bottom of the socket and reacting against a pressure plate bearing in turn against the spherical portion of an intermediate part formed on the other hand with a frustoconical portion fitting in a corresponding frustoconical cavity of the male member.

These improvements in ball-and-socket joints may advantageously be adapted to control linkages and also for mounting suspension systems of automobile vehicles.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing, in which:

FIGURE 1 is an axial section showing the upper ball-and-socket joint of a suspension member, and FIGURE 2 is a similar view of a ball-and-socket joint for the lower end of the suspension member.

Referring to the drawing, it will be seen in FIG. 1 that the ball-and-socket device of this invention is enclosed in a casing comprising two shells 1, 2 consisting preferably of sheet-metal pressed parts adequately secured to each other by means of their registering flanges 3, 4 through which extend bolts (not shown) for securing the device for example to a suitable part of the vehicle. The shell 1 of the casing which constitutes the female part of the device is internally of substantially spherical configuration and receives in this spherical cavity the male part 5 of the ball-and-socket joint which in the example illustrated is rigid with a rod 6. An intermediate member 7, 7¹ is disposed within the casing between the male member 5 and a bearing member 8 receiving the resilient thrust of a compression spring 9 bearing against the bottom of the opposite shell 2. The intermediate member comprises on the one hand a spherical portion $7^1$ fitting in a recess of same configuration in the bearing plate, and on the other hand a frustoconical portion 7 engaging a corresponding frustoconical recess in the male member 5. An aperture 10 is formed in the spherical portion of shell 1 to permit the free movement of the rod 6 associated with the ball-and-socket joint.

The joint is completed by a seal in the form of a metal cup 11 having a part-spherical inner surface corresponding in shape to and engaging the outer spherical head of shell 1, this cup being attached or glued to the inner wall of the tubular rubber or plastic packing member 12 threaded on the rod 6.

FIGURE 2 shows a ball-and-socket joint similar to that shown in FIG. 1 but wherein the permissible angular excursion of the rod is smaller than in the case of FIG. 1, the two joints being assumed to be associated with a suspension member of the vehicle.

The ball-and-socket device of this invention is characterized notably by the following advantages:

(1) Its manufacture is both easy and economical; thus, notably, it may be produced by cold stamping and/or forging;

(2) The intermediate member is also relatively easy to manufacture and may also be produced by cold stamping and/or forging.

(3) In spite of the relatively moderate overall dimensions of the casing the assembly permits relatively important angular movements of the male member 5 relative to the female member 1.

Of course, various modifications may be brought to the form of embodiment shown and described herein without departing from the spirit and scope of the invention as set forth in the appended claim.

I claim:

A ball-and-socket joint comprising a casing composed of a pair of complementary mating cold-pressed sheet metal shells having engaging flanges, means securing the flanges together, one of said shells having an inner spherical female surface, a male member of the joint bearing against said surface, a cold-pressed metal intermediate member having a frustoconical end portion seated in a cavity of the same configuration formed in the male member, said intermediate member having a part-spherical end portion directly opposite the frustoconical portion, a bearing plate having a part-spherical recess receiving the part-spherical portion, and a compression spring bearing against the bearing plate and mounted between the plate and the other of said shells.

References Cited in the file of this patent
UNITED STATES PATENTS

| | | |
|---|---|---|
| 2,727,768 | Latzen | Dec. 20, 1955 |
| 2,934,365 | Moskovitz | Apr. 26, 1960 |
| 2,957,713 | Herbenar | Oct. 25, 1960 |

FOREIGN PATENTS

| | | |
|---|---|---|
| 508,890 | Great Britain | July 7, 1939 |